United States Patent

Sundquist

[11] Patent Number: 5,852,968
[45] Date of Patent: Dec. 29, 1998

[54] FOOD PROCESSORS

[75] Inventor: Jarl Sundquist, Sollentuna, Sweden

[73] Assignee: AB Hällde Maskiner, Kista, Sweden

[21] Appl. No.: 98,782

[22] Filed: Jun. 17, 1998

[30] Foreign Application Priority Data

Jun. 26, 1997 [SE] Sweden .................................. 9702464

[51] Int. Cl.⁶ ............................ A23N 1/00; A47J 43/046; A47J 43/07; B02C 18/16
[52] U.S. Cl. ............................. 99/492; 99/510; 241/37.5; 241/92; 241/282.1; 366/314; 366/601
[58] Field of Search ................. 99/337, 486, 492, 99/501–505, 509–513; 241/37.5, 92, 282.1, 282.2, 280, 36; 200/302.2; 83/355, 356.3; 361/203; 366/314, 601

[56] References Cited

U.S. PATENT DOCUMENTS

| | | | |
|---|---|---|---|
| 4,371,118 | 2/1983 | Sontheimer et al. | 241/37.5 X |
| 4,542,857 | 9/1985 | Akasaka | 99/492 X |
| 4,629,131 | 12/1986 | Podell | 241/92 X |
| 4,691,870 | 9/1987 | Fukunaga et al. | 99/492 X |
| 4,741,482 | 5/1988 | Coggiola et al. | 241/282.1 X |
| 4,799,626 | 1/1989 | Hickel et al. | 99/492 X |
| 4,921,174 | 5/1990 | Okada et al. | 241/37.5 |
| 4,921,175 | 5/1990 | Okada et al. | 366/314 X |
| 5,071,077 | 12/1991 | Arroubi et al. | 241/36 |
| 5,244,275 | 9/1993 | Bauer et al. | 99/510 X |
| 5,347,205 | 9/1994 | Piland | 366/601 X |
| 5,435,237 | 7/1995 | Huang | 99/492 |
| 5,454,299 | 10/1995 | Gonneaud | 99/492 |
| 5,768,978 | 6/1998 | Dorner et al. | 366/601 X |

FOREIGN PATENT DOCUMENTS 0440051 8/1991 European Pat. Off. .
0589093 3/1994 European Pat. Off. .

*Primary Examiner*—Timothy F. Simone
*Attorney, Agent, or Firm*—Alfred J. Mangels

[57] ABSTRACT

A food processor having two mutually spaced sensors (14, 15) in the upper part (13) of the stand. One of the sensors or both of the sensors is/are adapted to coact with sensor-parts (16, 17, 18) placed respectively in a container lid (7) and a feed device (11). Either the lid or the feed device is provided with a sensor-part adapted to co-act with solely one (14) of the sensors in the stand (1) while the other of the lid or the feed device is provided with two mutually spaced sensor-parts adapted to co-act with both of the sensors (14, 15) in the stand. The stand sensors (14, 15) are connected to a control circuit (21) which functions to sense which of the sensors is active and to cause the motor regulating circuit (23) to activate the motor in two different speed ranges, depending on whether only one or both of the sensors (14, 15) is/are active.

4 Claims, 3 Drawing Sheets

FOOD PROCESSORS

BACKGROUND OF THE INVENTION

1. Field of the Invention

The present invention relates to an improvement in food processors.

Such processors are of the kind in which the raw material to be prepared has been placed in or is fed into a container in which a cutting tool is installed. Such machines also include a lid which is intended to be placed on the container when the machine is being used.

There are various different makes of such machines on the market, these machines being intended for use in industrial kitchens and also for domestic use.

2. Description of the Related Art

Food processors intended for industrial kitchens are normally special machines that are fitted with so-called S-blades for cutting-up raw foodstuffs, such as meat, parsley, onions, etc., and for also preparing purées. Such a machine includes an S-blade mounted in the bottom of the container and normally having two knives that rotate at high speeds. Another type of machine for use in industrial kitchens is a vegetable cutter or shredder, which has a cutting disc mounted in the upper part of the container. The cutting disc is supported by an upstanding drive shaft positioned axially through the container. These machines are used to cut potatoes, cucumbers, carrots, and like vegetables.

Also known are domestic food processors, and also food processors for industrial kitchens, which include both an S-blade and a cutting disc. In this case, different auxiliary appliances are fitted to the machine stand, which includes all devices for carrying out the intended functions of the machine.

One problem encountered with combination machines of the aforesaid kind intended for industrial kitchens and also for domestic use is that a cutting disc should be operated within a different speed range than the knives, if a good result is to be obtained.

Certain machines, and particularly domestic machines, have a single fixed speed setting or two fixed speed settings, which is a compromise between the speed ranges that are optimal for different uses of the machine. The lower speed is too high for cutting vegetables, while the higher speed is too low for the S-blade function.

Certain machines, however, include a knob by means of which the desired appropriate speed can be set. This means that the person operating the machine must set the knob to the speed that is appropriate with respect to the food to be processed and to know what speed intervals are appropriate in each respective case.

One problem with these machines is that they can easily be set to the wrong speed, for instance to a much too high speed when cutting vegetables. This will have a poor result, since it is often necessary to throw away raw foodstuffs that have been cut at excessively high speeds. For instance, potatoes will be cut into the shape of thin squares, instead of cubic shapes.

Another problem with such machines is that it can be dangerous to run the machine at a high speed when the machine is fitted with a cutting disc, since cutting discs are normally not balanced in the machine. This would result in vigorous machine vibrations with the risk of the machine toppling over and with the subsequent danger of injuring the person operating the machine.

These problems are solved by means of the present invention.

SUMMARY OF THE INVENTION

The present invention thus relates to an improvement in food processors that includes a machine stand which supports a motor, a drive shaft, and a knob or like device for operating the motor. The processor also has an S-blade arrangement which includes a container for receiving the raw foodstuff, or foodstuffs, to be prepared, a container lid, and one or more knives located at the bottom of the container and driven by means of said drive shaft. The food processor further includes a vegetable cutting arrangement that includes a cutting disc which is intended to be fastened in the upper region of said drive shaft, and a feeding device which is intended to be fitted above the cutting disc and which is used to feed down the raw materials to be cut. The food processor also includes two mutually spaced sensors in the upper part of the machine stand. One of the sensors, or both sensors, is/are intended to coact with sensor-parts placed in the lid and in said feed device respectively. Either the lid or the feed device is provided with a sensor-part adapted to co-act with solely one of the stand sensors, while the other of said lid and said feed device is provided with two mutually spaced sensor-parts adapted to co-act with both sensors on the machine stand. The stand sensors are connected to a control circuit which is adapted to sense which of the sensors is active and to actuate the motor control circuit so as to activate the motor in two different speed ranges depending on whether only one sensor or both sensors is/are active.

BRIEF DESCRIPTION OF THE DRAWINGS

The present invention will now be described in more detail with reference to exemplifying embodiments thereof and also with reference to the accompanying drawings, in which.

DESCRIPTION OF THE PREFERRED EMBODIMENTS

Figure 1:
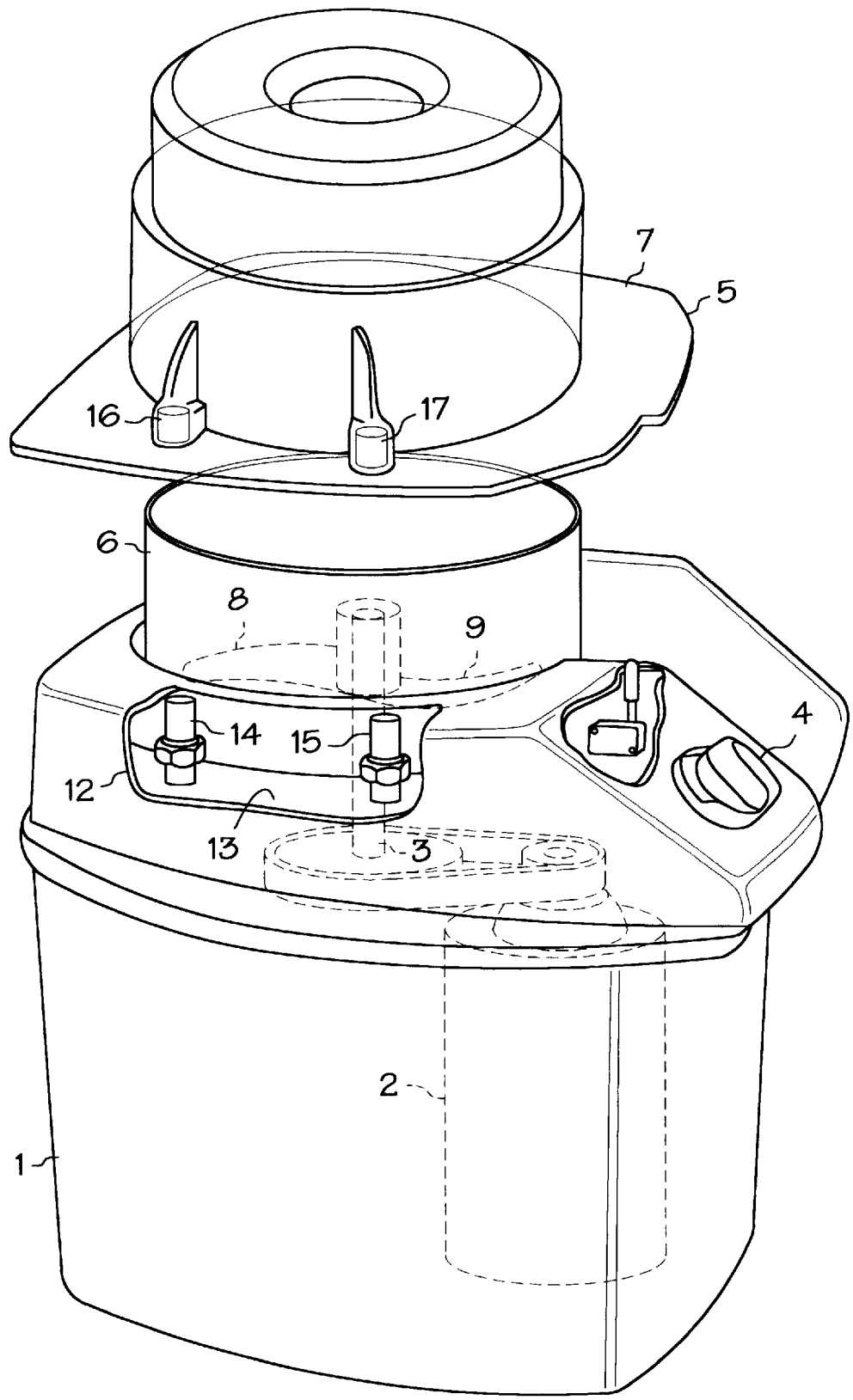
FIG. 1 is a partially cut-away side perspective view of an inventive food processor, and shows foodstuff cutting equipment slightly above the machine.
Figure 2:
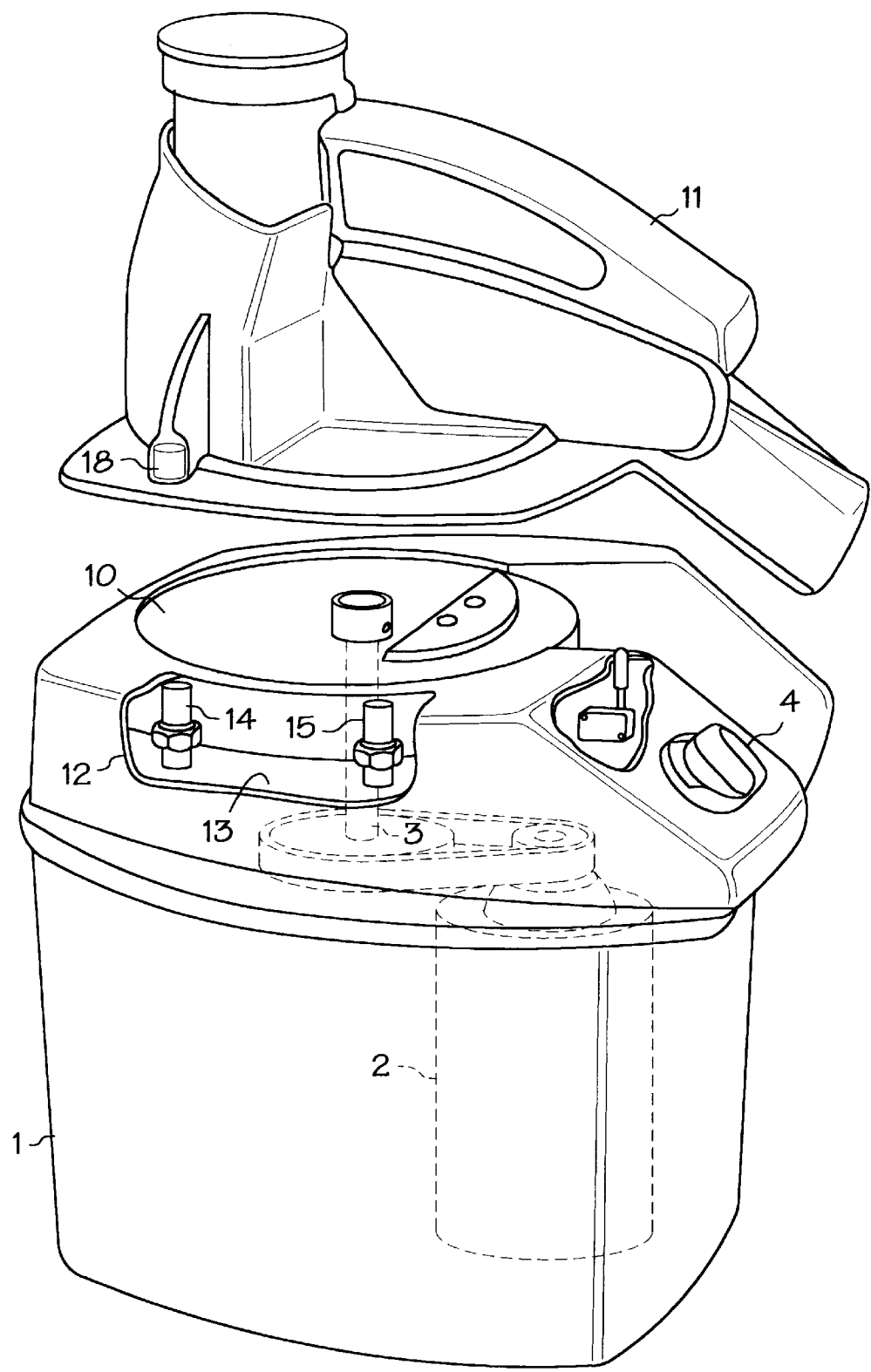
FIG. 2 is a partially cut-away side perspective view of an inventive food processor and shows vegetable cutting means slightly above the processor.

FIGS. 1 and 2 illustrate a food processor that includes a processor stand 1, a motor 2, a drive shaft 3, and a knob 4 or like device for operating the motor 2.

The food processor illustrated in FIG. 1 also includes aso-called S-blade device 5 which includes a container 6 for receiving the raw material or raw materials to be prepared, a container lid 7, and one or more knives 8, 9 driven by means of said drive shaft 3 and located at the bottom of the container 6. The lid shown in FIG. 1 is fitted over the container and is fastened in a known manner by means of a bayonet fitting (not shown) in the machine stand.

FIG. 2 shows the food processor equipped with a vegetable cutting device that includes a cutting disc 10 which is fastened at the top of the drive shaft 3. The food processor is also shown to include a feed device 11 which is fitted over the cutting disc by means of a bayonet fitting (not shown) on the processor stand and with which raw material to be processed is fed down into the processor.

Many different designs of such processors are available, of which the processor shown in FIG. 1 is a so-called S-blade type of processor used in industrial kitchens, for instance.

The processor stand shown in FIGS. 1 and 2 is partially cut-away at reference numeral 12.

In accordance with the invention, the upper part 13 of the processor stand 1 accommodates two mutually spaced sensors 14, 15. One of the sensors, or both of the sensors, is/are adapted to co-act with sensor-parts 16, 17, 18 placed in the lid 7 and in the feeding device 11 respectively.

Either the lid 7 or the feeding device 11 is provided with a sensor-part adapted to co-act with solely one of the sensors 14, 15 in the processor stand 1, while the other of said lid and said feeding device is provided with two mutually spaced sensor-parts adapted to co-act with both of the sensors 14, 15 on the processor stand 1.

In the illustrated embodiments, the lid 7 of FIG. 1 is provided with two sensor-parts 16, 17, while the feeder 11 of FIG. 2 is provided with only one sensor-part 18. When the lid 7 is fitted to the processor stand 1, the respective sensor-parts 16 and 17 will be located close to, or in abutment with, the upper side of respective sensors 14, 15. When the feeder 11 is fitted to the stand 1, the sensor-part 18 will be located close to or in abutment with the upper side of the sensor 14.

Figure 3:
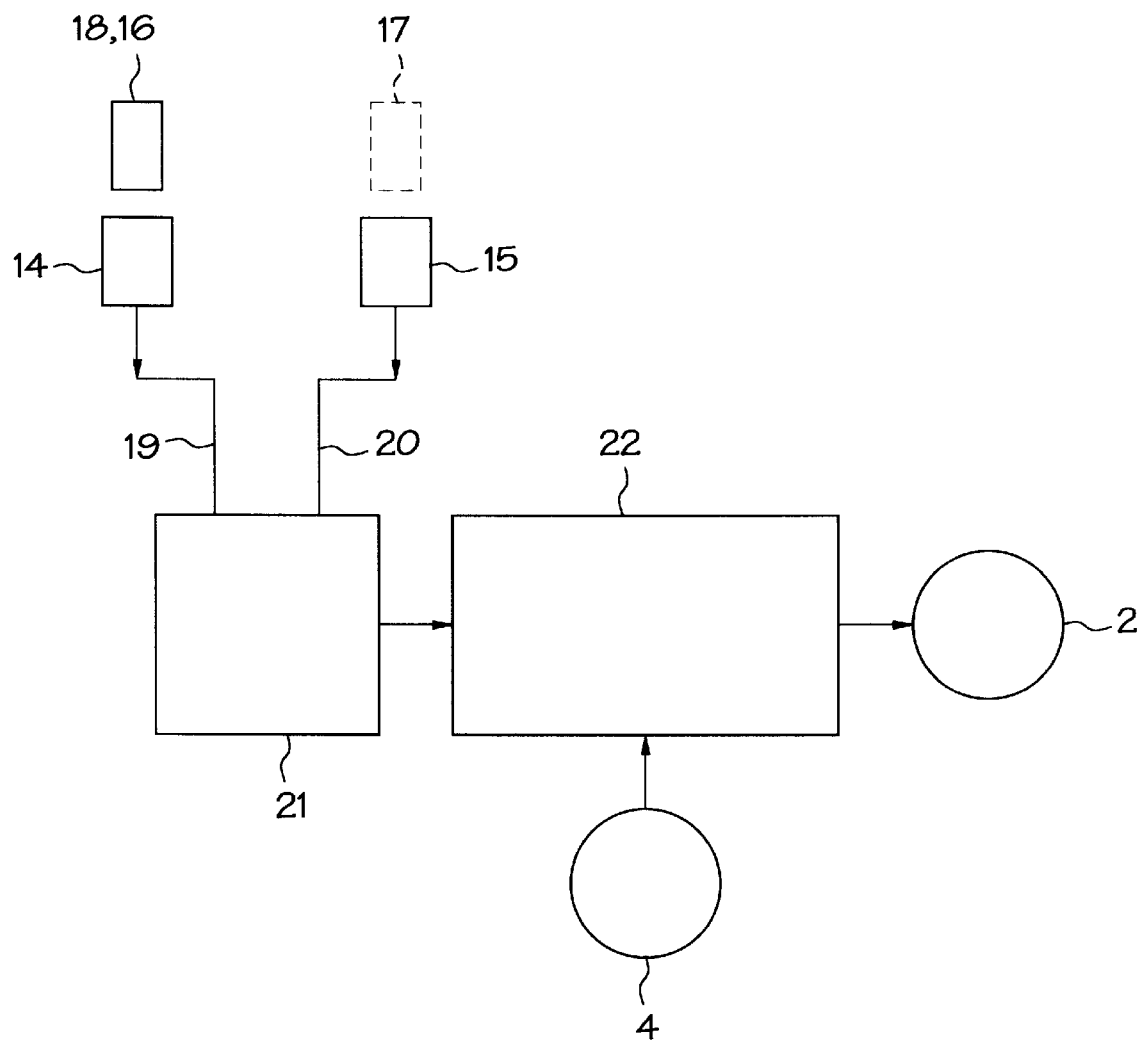
FIG. 3 is a block schematic illustrating a control circuit for the food processor.

As shown in FIG. 3, and according to the invention, the sensors 14, 15 in the stand 1 are connected by conductors 19, 20 to a control circuit 21 which is adapted to sense which of the sensors 14, 15 is active, i.e. senses a sensor-part 16, 17, 18.

When the lid 7 is fitted, both sensors 14 and 15 are active, since they co-act with the sensor parts 16 and 17. When the feeder 11 is fitted, only one sensor 14, 15 will be active because of the single sensor-part 18.

The control circuit 21 is also adapted to cause the motor regulating circuit 22 to activate the motor in two different speed ranges, depending on whether only one sensor 14 or both sensors 14, 15 is/are active. When the lid 7 is fitted for an S-blade function, a suitable speed range is 1500–3000 r.p.m., whereas a speed range of 500–850 r.p.m. is suitable for a vegetable cutting function.

The control circuits 21 and 22 are of a known appropriate kind, consequently these circuits will not be described in detail here.

Naturally, the regulating circuit 22 may function to control the motor in two fixed speeds, depending on whether one or two sensors are active. However, it is preferred that the speed is controlled within the range to which the control circuit 21 is set by means of said knob 4 or like device. For instance, the knob can be turned to a zero point when the motor stops. When turning the knob from this zero point, the motor can be caused to operate at a slowest speed within the lowest range and at the highest speed within the highest speed range, as appropriate.

According to one highly preferred embodiment, the control circuit 21 is adapted to prevent the regulating circuit 22 from starting the motor when none of the sensors 14, 15 is active. This provides a very high degree of safety against unintentional starting of the processor with subsequent risk of injury to the person concerned.

In one preferred embodiment, the sensors 14, 15 are known magnet sensors that are adapted to co-act with sensor-parts 16, 17, 18 that have the form of permanent magnets. More specifically, the sensor is preferably a so-called read switch that conducts current when actuated by the field of a permanent magnet.

Naturally, other types of sensors can be used, such as a microswitch or an inductive sensor.

It will be evident from the aforegoing that the present invention solves the aforesaid problems and improves the safety aspect of the processor.

Although the invention has been described with reference to certain embodiments, it will be obvious that the invention can be realized in other designs of combined S-blade and vegetable-cutting processors of the kind addressed by the present invention.

The present invention can thus be modified with respect to different structural solutions without departing from the inventive concept.

The present invention is therefore not restricted to the aforedescribed exemplifying embodiments thereof and modifications and variations can be made between the scope of the following claims.

What is claimed is:

1. A food processor including a stand, a motor, a drive shaft, and a manually-operable speed control device for operating the motor, wherein the processor is adapted to receive an S-blade cutting device that includes a container for foodstuffs to be processed, a container lid, and at least one knife that is driven by said drive shaft and located at the bottom of the container, and wherein the processor is also adapted to receive a vegetable cutting device that includes a cutting disc which is adapted to be fastened to said drive shaft, and feed means mounted above the cutting disc for feeding foodstuffs to be cut, said food processor comprising: two mutually spaced sensors in an upper part of the stand; at least one of the sensors adapted to coact with sensor-parts placed respectively in said container lid and in said feed means; wherein one of the lid and the feed means is provided with a corresponding sensor-part adapted to co-act with solely one of the sensors in the stand and wherein the other of said lid and said feed means includes two mutually spaced corresponding sensor-parts adapted to co-act with both of the sensors in the stand; and wherein the stand sensors are connected to a control circuit that senses which of the sensors senses a corresponding sensor-part and to cause a motor regulating circuit to activate and to cause the motor regulating circuit to activate the motor in one of two different speed ranges, the speed range depending on the number of sensors that sense a corresponding sensor-part.

2. A food processor according to claim 1, wherein the manually-operable speed control device regulates the motor speed within a range of speeds set by the control circuit.

3. A food processor according to claim 1, wherein the control circuit is adapted to prevent the motor regulating circuit from starting the motor when none of the sensors senses a corresponding sensor-part.

4. A food processor according to claim 1, wherein said sensors are magnetic sensors and are adapted to co-act with sensor-parts in the form of permanent magnets.

* * * * *